United States Patent
Bobkin et al.

(10) Patent No.: US 6,732,005 B1
(45) Date of Patent: May 4, 2004

(54) METHOD AND SYSTEM FOR REDUCING ERRORS IN A MANUFACTURING PROCESS

(75) Inventors: Aaron Bobkin, Farmington Hills, MI (US); David Odett, Chesterfield, MI (US); Saeid Soleimani, Novi, MI (US); Donald Edward Fetterman, St. Clair Shores, MI (US); Gavin Haag, Dearborn, MI (US); Jim Mathew Nicholson, Grosse Pte. Woods, MI (US); Mike Palo, Bloomfield, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/249,158

(22) Filed: Mar. 19, 2003

(51) Int. Cl.[7] .............................................. G06F 19/00
(52) U.S. Cl. ........................ 700/115; 700/116; 29/711
(58) Field of Search ................................ 700/116, 115; 29/707, 710, 711; 702/35

(56) References Cited

U.S. PATENT DOCUMENTS 6,240,633 B1 * 6/2001 Kent et al. ..................... 29/707
6,516,239 B1 * 2/2003 Madden et al. ............. 700/115
6,567,714 B2 * 5/2003 O'Connor et al. .......... 700/115
6,615,091 B1 * 9/2003 Birchenough et al. ........ 700/96

* cited by examiner

Primary Examiner—Albert W. Paladini
(74) Attorney, Agent, or Firm—Raymond L. Coppiellie

(57) ABSTRACT

A method and system (10) for reducing errors in a vehicle manufacturing process is provided. The system is a non-segmented network that includes a plurality of servers (30, 40, 46, 48) for storing build data and transmitting the data to a tracking controller (20). The tracking controller (20) identifies the assembly (18) entering a manufacturing zone (14) and generates positioning information related to the assembly as it passes through the zone (14). The tracking controller (20) is electronically coupled to a series of local I/O interfaces (32) for transmitting the identity, the position information, and the build data of the assembly (18) thereto. Each local I/O interface (32) has one or more I/O manufacturing tools (34, 36) coupled thereto for allowing an operator to perform an assembly task pursuant to the build data. In addition, the I/O manufacturing tools (34, 36) detect whether a successful build condition or an unsuccessful build condition results from performance of the assembly task.

17 Claims, 4 Drawing Sheets

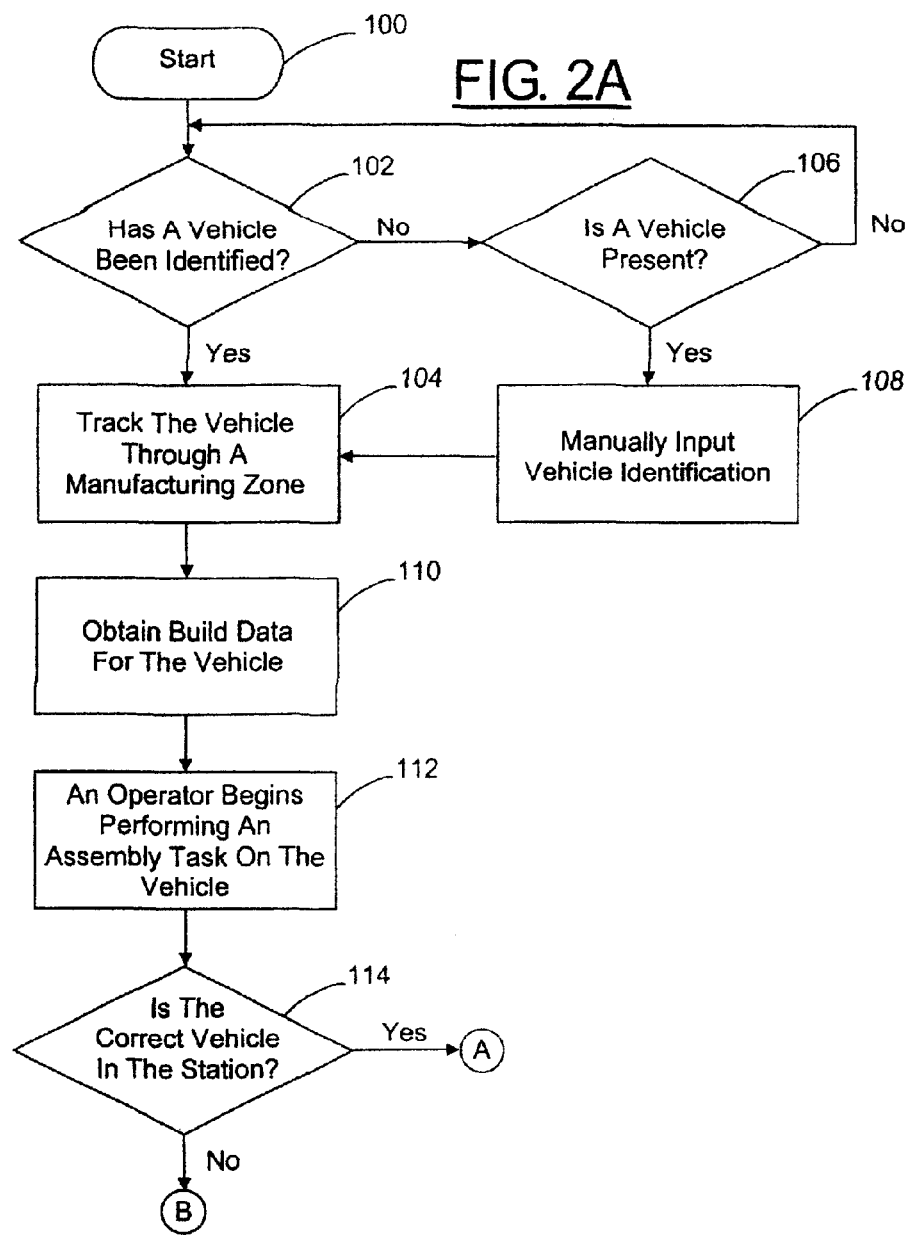

METHOD AND SYSTEM FOR REDUCING ERRORS IN A MANUFACTURING PROCESS

BACKGROUND OF INVENTION

The present invention relates generally to manufacturing processes, and more particularly to a method and system for preventing and correcting errors in manufacturing processes.

Automotive manufacturers are well known for implementing industrial networks for manufacturing vehicles. Typical network architecture is comprised of a series of computers that are located at stations of an assembly line. Each computer normally includes moving parts, such as a hard drive. Additionally, each computer usually has its own cooling and ventilation system. The cooling and ventilation system removes heat from the computer that can otherwise damage the computer if it is not removed. The cooling and ventilation system also protects the computer from dust and other air-borne particles that can damage internal components of the computer.

Furthermore, the existing networks typically have a segmented architecture. A common segmented network may include a DEVICENET network segment and a CONTROLNET network segment. One skilled in the art will understand that each segment can have different throughput, determinism, and redundancy characteristics.

A drawback of these networks is that they typically execute only building protocols and not an effective error-proofing protocol that can reduce errors in the manufacturing process.

Another drawback of these networks is that the computers are not adequately constructed for use on the plant floor. For example, the moving parts of the computers can wear down over time and eventually fall into a state of disrepair. Moreover, the cooling and ventilation systems, which allow the computers to withstand the plant floor environment, can be relatively expensive. It is understood that a variety of other situations may exist where substantial and costly maintenance of the computers is required.

Yet another drawback of these networks is that the segmented architecture can cause poor transmission of data between the disparate network segments. Specifically, each network segment can have distinct attributes, as described above, which cause the inefficient transmission of data. One skilled in the art will understand that this construction may result in a poor consistency of data transmitted through the network.

Therefore, a need exists to provide a robust network that reduces the occurrence of errors during the manufacturing process, readily endures the environment of a plant floor, decreases maintenance and operation costs associated therewith, and efficiently transmits data.

SUMMARY OF INVENTION

The present invention provides a method and system for reducing errors in a vehicle manufacturing process. The system is a non-segmented network that includes a plurality of servers for storing build data. The servers are electronically coupled to a tracking controller for sending build data thereto. The tracking controller identifies the assembly entering a manufacturing zone and generates positioning information related to the assembly as it passes through the zone. The tracking controller is electronically coupled to a series of local I/O interfaces positioned within a series of stations of the zone. The tracking controller transmits the identity and the position information of the assembly to the local I/O interfaces. The local I/O interfaces also receive build data from the servers. The local I/O interfaces have one or more I/O manufacturing tools coupled thereto for allowing an operator to perform an assembly task pursuant to the build data. In addition, the I/O manufacturing tools detect whether a successful build condition or an unsuccessful build condition results from performance of the assembly task. Upon detection of an unsuccessful build condition, the network notifies the operator to correct the problem.

One advantage of the present invention is that a method and system for manufacturing an assembly is provided that prevents and corrects errors that can occur during the manufacturing process.

Another advantage of the present invention is that a method and system for manufacturing an assembly is provided that includes a plurality of robust I/O interfaces, which do not have moving parts, are relatively inexpensive, and can readily withstand the environment of a plant floor.

Yet another advantage of the present invention is that a method and system for manufacturing an assembly is provided that includes a non-segmented network that allows for the efficient transmission of data throughout the network.

Other advantages of the present invention will become apparent when viewed in light of the detailed description of the invention in conjunction with the attached drawings and appended claims.

BRIEF DESCRIPTION OF DRAWINGS

For a more complete understanding of this invention, reference should now be made to the embodiments illustrated in greater detail in the accompanying drawings and described below by way of examples of the invention.

FIGS. 2A–2C is a logic flow diagram of a method for operating a system that reduces error in a vehicle manufacturing process, according to one embodiment of the present invention.

DETAILED DESCRIPTION

The present invention is particularly suited for a vehicle manufacturing process. However, it is understood that the present invention may be employed for a wide a variety of assemblies other than vehicles.

Figure 1:
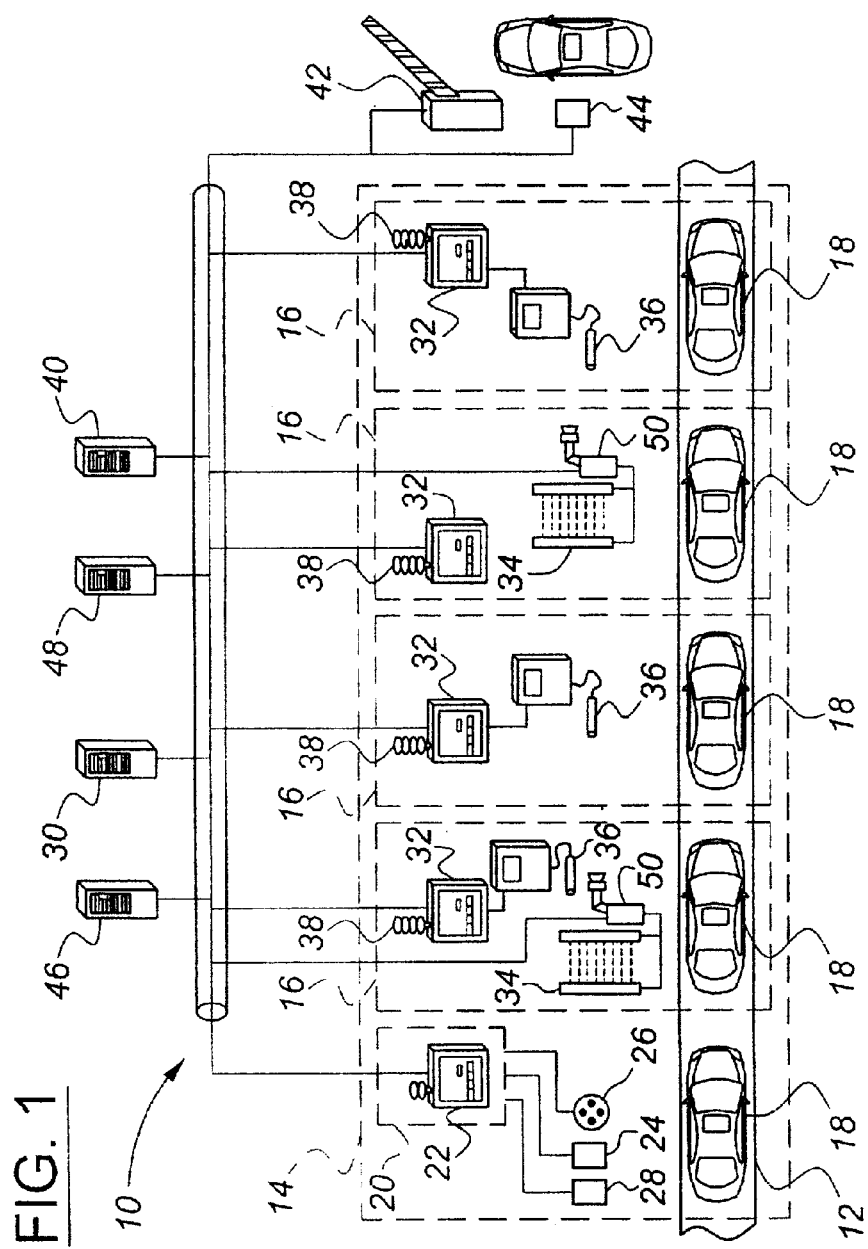
FIG. 1 is a schematic diagram illustrating a system for reducing error in a vehicle manufacturing process, according to one embodiment of the present invention.

Referring to FIG. 1, there is shown a diagram of a system 10 for reducing error in a vehicle manufacturing process, according to one embodiment of the present invention. As detailed in the descriptions below, the system 10 utilizes a variety of tracking mechanisms, communication devices, and sensors for decreasing errors in the manufacturing process.

The system 10 includes and is structured around a conveyor line 12 of an assembly plant. The conveyor line 12 is demarcated by a plurality of manufacturing zones 14 and a series of stations 16 within each zone 14. Each station 16 is a location in which a predetermined assembly task is performed on a vehicle 18. For example, one station can be dedicated for an operator to fasten seats to the vehicles. However, it is understood the station 16 can be intended to have the operator perform a variety of other assembly tasks on the vehicle 18.

Each zone 14 includes a tracking controller 20 for identifying the vehicles 18 as they enter a zone 14 and managing a queue of the vehicles 18 as they pass through the zone 14. In other words, the tracking controller 20 utilizes various sensors for tracking the positions of the identified vehicles.

In particular, the tracking controller 20 includes a tracking I/O interface 22 that is coupled to a primary identifier mechanism 24 and a position encoder 26. The tracking I/O interface 22 utilizes the primary identifier mechanism 24 and the position encoder 26 in combination to determine the identities and the positions of the vehicles 18 as they pass through the zone 14. In one embodiment, the primary identifier mechanism 24 is a bar code scanner that is intended to read a bar code label attached to a predetermined area of the vehicle 18. Specifically, the bar code label may be attached to a front portion of the vehicle 18 and may identify the vehicle 18 by its vehicle identification number (VIN). On the other hand, the bar code label can be attached to other portions of the vehicle and can identify the vehicle by other classifications or names as desired.

Moreover, the tracking controller 20 utilizes the position encoder 26 to determine the position of the conveyor line 12. In this respect, the tracking controller 20 associates a vehicle 18 with a particular point on the conveyor line 12 at the moment the primary identifier mechanism 24 identifies the vehicle 18. Therefore, the tracking controller 20 precisely tracks the position of an identified vehicle 18 as the conveyor line 12 moves the vehicle 18 from the point where the vehicle is identified.

The tracking controller 20 further includes one or more secondary identifier mechanisms 28. These mechanisms 28 are intended to identify the vehicles 18 when the primary identifier mechanism 24 fails to identify the vehicles 18. For instance, this situation may occur when a bar code label or other tag is covered, detached from the vehicle, or otherwise unreadable.

The secondary identifier mechanism 28 is a movement detector and alternatively is any other suitable mechanism that can detect the presence of the vehicle 18. The detector is intended to detect the presence of the vehicle 18 when the primary identifier mechanism 24 has failed to identify a vehicle. In this situation, the tracking I/O interface 22 commands the conveyor line 12 to stop, alerts an operator of a non-read condition, and prompts the operator to manually input an identification of the vehicle 18 into the tracking I/O interface 22.

Another feature of the tracking controller 20 is that it assigns a rotation number to each identified vehicle 18 for the purpose of creating a queue of the vehicles 18 passing through the zone 14. Each rotation number includes relatively few characters in comparison to a VIN. A person skilled in the art will understand that the transmission of a shorter rotation number, instead of the typically lengthy VIN, can increase data transmission characteristics of the system. However, it is understood that VINs or various other suitable tags may be utilized to identify the vehicles 18 as desired.

Still another feature of the tracking controller 20 is that it can permit an operator to deactivate the position encoder 26, the primary identifier mechanisms 24, and the secondary identifier mechanisms 28. This feature would allow the operator to bypass the auto tracking element of the system 10 and permit him to manually enter the identification of the vehicles 18 into the tracking I/O interface 22. Manual identification of the vehicles 18 can be beneficial when the auto tracking devices are malfunctioning or are otherwise inoperative.

As shown in FIG. 1, the tracking controller 20 is electronically coupled to a build data server 30 and submits a request for the build data related to the vehicles 18 entering the zone 14. The build data server 30 stores a database of build data associated with a variety of vehicles. By way of example, the build data may include a desired torque value for applying a bolt that secures a specific part to a specific vehicle. However, it is understood that the build data can describe a variety of other desired values or assembly tasks.

Additionally, the build data is indexed within the database according to the VIN of the vehicles 18. In this regard, the tracking controller 20 can request build data for a particular vehicle by sending the VIN of the vehicle to the build data server. Alternatively, other suitable indexing methods may be utilized as desired.

The tracking controller 20 then receives the build data from the build data server 30 and sends the positioning information, rotation number, and corresponding build data of the identified vehicle to a local I/O interface 32. The local I/O interface 32 is positioned within the station 16 currently receiving the identified vehicle 18. The tracking I/O interface 22 and the local I/O interface 32 are embedded controllers with no moving parts. As one skilled in the art will understand, the absence of moving parts increases the longevity of the interfaces 22, 32, especially those that are located on the plant floor. Each interface 22, 32 is comprised of a power supply, an I/O board, embedded processor, Ethernet cards, a touch screen monitor, and a chassis. The interfaces 22, 32 communicate with each other over a non-segmented Ethernet network. However, it is understood that other suitable types of non-segmented networks may be employed.

The tracking controller 20 sends the identity, positioning information, and build data at the moment when a prespecified part of a pre-specified job has entered a station. For example, if a process is in a rear of a vehicle, the job-in-station is transmitted only when the rear of the vehicle 18 enters the station 16. The local I/O interface 32 then utilizes the build data to prompt the operator to perform a predetermined assembly task on the vehicle 18. For example, the local I/O interface 32 may display a message on its touch screen monitor for the purpose of notifying the operator to perform a specific task.

The local I/O interface 22 is coupled to one or more I/O manufacturing tools for allowing an operator to respond to the prompting and perform the desired assembly task on the vehicle 18. In addition, the I/O manufacturing tool also determines whether the task has been successfully or unsuccessfully performed.

For example, the I/O manufacturing tool can be a part pick light array 34. The light array 34 can indicate to an operator that a predetermined part is intended to be selected by the operator and mounted on the vehicle 18. Specifically, the pick light array 34 can surround an assortment of bins each respectively containing specific kinds of parts. The pick light array 34 may illuminate a light adjacent to or otherwise corresponding to a particular bin when the build data requires that the operator select a part from that bin. The pick light array 34 also includes one or more detection beams for detecting the bin that the operator has reached into for selecting the part. In this regard, the operator may break the detection beam for the wrong bin thereby causing the pick light array 34 to detect an improper part selection. As a result, the local I/O interface can sound an alarm 50 to notify the operator of his improper selection.

Another I/O manufacturing tool is a torque tool 36 for fastening a part to the vehicle 18. The torque tool 36 can repeatedly apply a predetermined amount of torque to a fastener, as well as detect the amount of torque that was actually applied to the fastener. Besides the part pick light array 34 and the torque tool 36, it is understood that various other I/O manufacturing tools may be utilized as desired.

As shown in FIG. 1, each local I/O interface 32 is coupled to a multi-stack light 38 and activates the light 38 according to a predetermined lighting pattern so as to notify the operator of the build status of the vehicle 18. The light 38 may be comprised of a green light, an amber light, and a red light. A typical lighting pattern can require the amber light to flash repeatedly for the purpose of indicating to the operator that the vehicle has passed through 70% of the station and the assembly task has not yet been completed. Of course, a wide variety of other colors and lighting patterns may be utilized to inform the operator of a specific vehicle build status.

The system 10 also includes a quality control sub-system for preventing an incorrectly assembled vehicle from leaving the plant without being repaired. The sub-system includes a quality control server 40 that is coupled to each local I/O interface 32. The quality control server 40 is intended to receive an unsuccessful build message from a local I/O interface 32 when the respective I/O manufacturing tool has detected an unsuccessful build condition.

An unsuccessful build condition exists when the vehicle 18 has left a station 16 without having the predetermined assembly task being fully or correctly performed thereon. The quality control server 40 utilizes the unsuccessful build messages to compile a database of vehicles 18 that have not been built according to their respective build data.

The quality control server 40 is coupled to a gate 42 and a quality identifier mechanism 44, which are both positioned adjacent to an exit of the plant. The quality control server 40 employs the quality identifier mechanism 44 to identify the vehicle 18. If the quality control server 40 determines that the vehicle 18 is listed in the database of unsuccessfully built vehicles, then the server 40 actuates the gate 42 to close and prevent the vehicle from physically exiting the plant. As a result, the vehicle 18 is returned to a repair bay within the plant and the problem is identified and corrected.

Another feature of the invention is that the system 10 includes an error proofing server 46 that is a central hub through which the local I/O interfaces 32 connect to all other components of the system 10. In particular, the error proofing server 46 monitors the health of local I/O interfaces 32 and maintains the configuration of them. Additionally, the error proofing server 46 can compile a database of the inputs received from the local I/O interfaces 32 and the I/O manufacturing tools so as to generate a report related to the performance of the system 10. For example, the error proofing server 46 can generate error proofing data and display the data to users via the internet.

Yet another feature of the invention is that the system 10 includes a monitoring server 48 that is electronically coupled to every component of the system 10. The monitoring server 48 is intended to monitor the efficiency of those components. For example, the monitoring server 48 can monitor the up time of the conveyor line 12 and the occurrences of failure of any of the system's components.

Figure 2B:
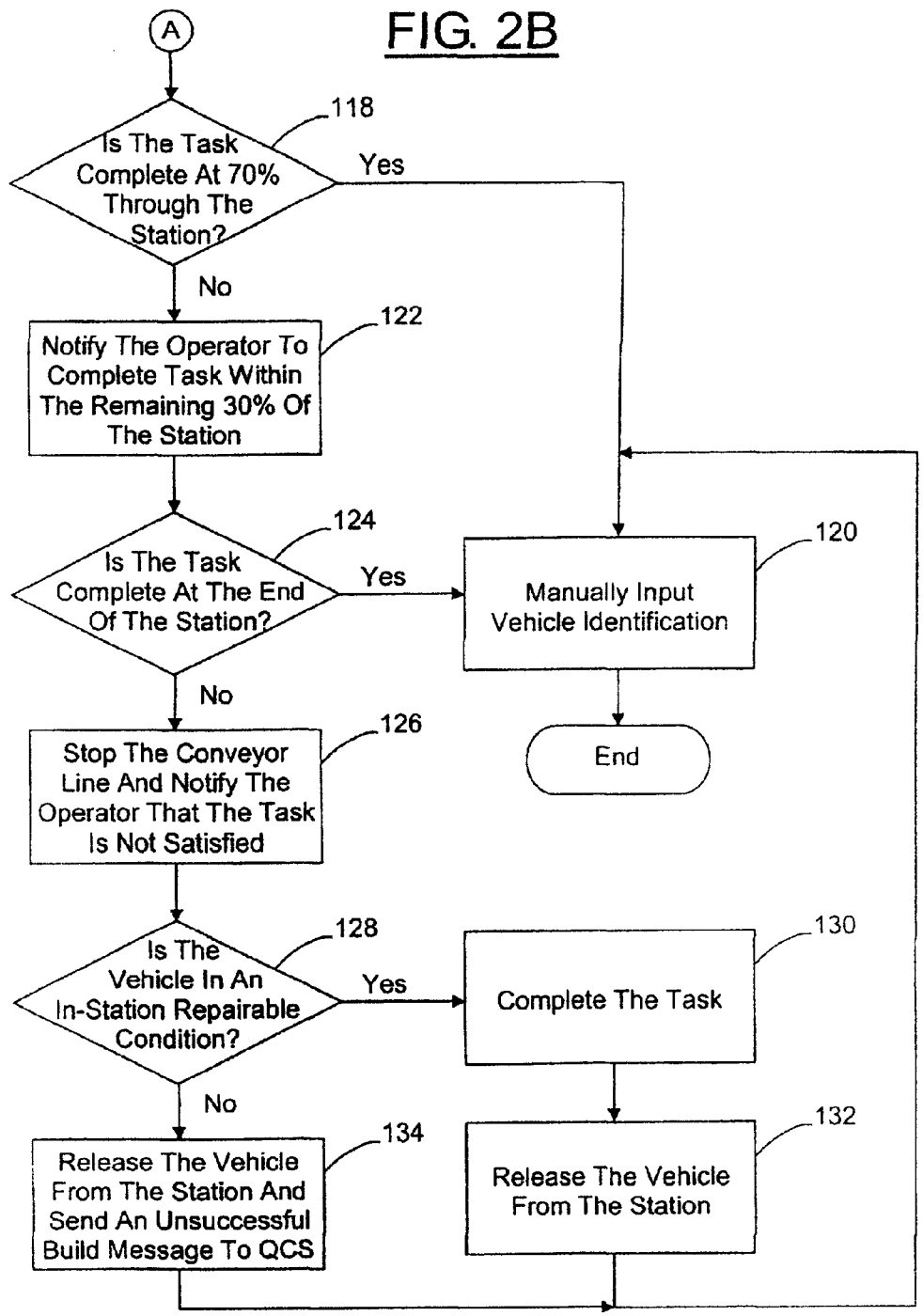
Figure 2C:
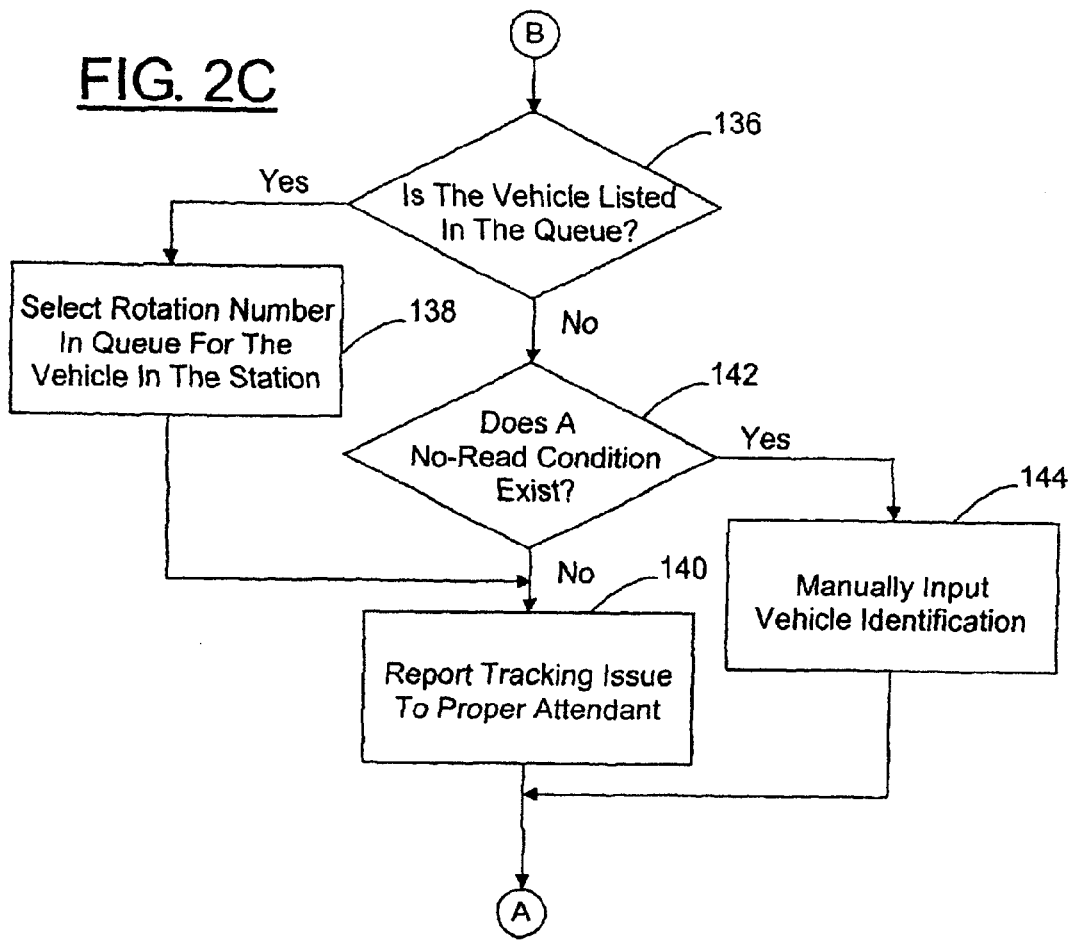

Referring now to FIGS. 2A–2C, there is shown a logic flow diagram illustrating a method for operating a system, which reduces error in a vehicle manufacturing process, according to one embodiment of the invention. The method begins at step 100 and then immediately proceeds to step 102.

In step 102, the tracking controller 20 determines whether a vehicle 18 has been identified. The identity of the vehicle 18 determines the type of assembly tasks that are to be performed on the vehicle 18.

This step is accomplished by utilizing the tracking controller 20, which includes the tracking I/O interface 22 that is coupled to the primary identifier mechanism 24. The identifier mechanism 24 is preferably a bar code scanner intended to read a bar code label attached to a predetermined part of the vehicle 18. The bar code label provides the tracking controller 20 with the identity of the vehicle 18, i.e. VIN. However, it is understood that various other vehicle identifier mechanisms may be utilized as desired.

If the tracking controller 20 determines that a vehicle has been identified, then the sequence proceeds to step 104, as will be discussed below.

However, if the tracking controller 20 determines that no vehicle has been identified, then the sequence proceeds immediately to step 106.

In step 106, the tracking controller 20 utilizes a secondary identifier mechanism 28 to determine if a vehicle 18 is present. The secondary identifier mechanism 28 can be a movement detector or a variety of other suitable detectors that detect the presence of a vehicle 18. If the secondary identifier mechanism 28 does not detect a vehicle 18, then the sequence returns to step 102.

If, however, the secondary identifier mechanism 28 does detect the presence of a vehicle 18, then the sequence proceeds to step 108. In step 108, the tracking controller 20 activates a multi-stack light 38 to flash a red light for the purpose of notifying an operator of the no-read condition. In response, the operator determines the identity of the vehicle 18 and manually inputs the identity of the vehicle 18 into the tracking controller 20. For example, the operator may input the identity via a touch screen monitor of a tracking I/O interface 22. However, it is understood that the identity of the vehicle 18 can be obtained by a variety of other suitable methods as desired. The sequence then proceeds to step 104.

In step 104, the position of the vehicle 18 is tracked as it moves through the manufacturing zone 14. This step is accomplished by utilizing the tracking controller 20, as described above, with a position encoder 26 that is coupled between the conveyor line 12 and the tracking controller 20. The primary identifier mechanism 24 determines the identity of the vehicle 18 when the vehicle 18 passes a predetermined point in the manufacturing zone 14, i.e. the very beginning of the zone 14. From the moment the identification is obtained, the tracking controller 20 utilizes the position encoder 26 to measure the distance that the conveyor line 12 travels from the predetermined point and associates this distance with the identified vehicle. This function allows the tracking controller 20 to determine the vehicle's position in the zone 14. However, it is understood that other suitable methods may be employed to determine the position of the vehicle in the zone 14. The sequence then proceeds to step 110.

In step 110, the tracking controller 20 receives build data related to the identified vehicle. Specifically, the tracking controller 20 initially submits a request to a build data server 30, which has a database of build data for a variety of vehicles. The database preferably is indexed according to the identification as provided by the primary identifier mechanism 24. By way of the previous example, the build data server 30 may index the build data according to the VIN of the vehicles 18. Alternatively, the build data server 30 can compile the build data by various other suitable methods. Upon receiving the request for the build data, the build data server 30 sends the relevant build data to the tracking controller 20. Then, the sequence proceeds to step 112.

In step 112, a local I/O interface 32 that is positioned within a station 16 prompts an operator to perform an assembly task on the vehicle 18 according to the build data for that vehicle. In particular, this step begins when the tracking controller 20 determines that the vehicle is entering the station 16. As the vehicle enters the station, the local I/O interface activates a multi-stack light to notify the operator that the vehicle 18 entering the station 16 requires a task to be performed thereon. Also, the tracking controller 20 sends the identity, the positioning information, and the corresponding build data of the vehicle 18 to the local I/O interface 32 in the station 16. The I/O interface 32 utilizes the build data to instruct the operator to perform a specific predetermined assembly task.

The operator then follows the instruction and utilizes an I/O manufacturing tool to perform the predetermined assembly task. The tool is coupled to the local I/O interface 32 and facilitates the operator in accomplishing the predetermined assembly task. For example, the tool may be a part pick light array (as detailed in the description for FIG. 1) or a torque tool (as detailed in the description for FIG. 1). However, it is understood that various other methods may be employed to accomplish this step. The sequence then proceeds to step 114.

In step 114, the operator determines whether the vehicle 18 entering the station 16 is the vehicle 18 identified by the tracking controller 20. If the vehicle 18 is not correctly identified by the tracking controller 20, then the sequence proceeds to step 116, as will be described later.

However if the vehicle is correctly identified by the tracking controller 20, then the sequence proceeds to step 118.

In step 118, the local I/O interface 32 determines whether the assembly task has been completed before the vehicle 18 has passed through 70% of the station 16. This step is accomplished by utilizing the I/O manufacturing tool. For example, the part pick light array 34 can detect if the correct part was selected for mounting on the vehicle 18. Also the torque tool 36 can detect if the correct amount of torque was applied. If the assembly task has been completed pursuant to the build data before the vehicle 18 has passed through 70% of the station, then the sequence proceeds to step 120.

In step 120, the local I/O interface 32 activates the multi-stack light 38 in order to illuminate a solid green light and indicate to the operator that nothing else remains to be done for that vehicle 18 in that station 16. Then, a release message is sent from the local I/O interface 32 to the error proofing server 46. The error proofing server 46 can compile a database of release messages to generate reports relating to the performance of the manufacturing system 10. Thereafter, the vehicle 18 exits the station 16, the green light turns off, and the vehicle 18 either enters the next station for the next assembly task or exits the zone 14 completely.

If, however, in step 118 the assembly task has not been completed before the vehicle has passed through 70% of the station, then the sequence proceeds to step 122. In step 122, the local I/O interface activates the multi-stack light 38 to flash the amber light, which notifies the operator that he has to complete the task before the vehicle 18 travels through the remaining 30% of the station 16. Then, the sequence proceeds to step 124.

In step 124, the local I/O interface 32 determines whether the assembly task has been performed by the time the vehicle 18 has reached the exit line of the station 16. If the assembly task has been completed at this point, then the sequence proceeds to step 120. However, if the assembly task has not been completed by this point, then the sequence proceeds to step 126.

In step 126, the local I/O interface 32 actuates the multi-stack light 38 to cease flashing the amber light and to illuminate a solid red light. The solid red light notifies the operator that the job is incomplete when the vehicle has reached the exit line of the station 16. For example, this step may occur when a torque tool 36 detects that the operator applied a torque value to a fastener that is not compliant with the build data. Also, the local I/O interface 32 commands the conveyor line 12 to stop. Then, the sequence proceeds to step 128.

In step 128, the operator determines whether the vehicle 18 is in an in-station repairable condition. The in-station repairable condition exists when the assembly task can be completed on the vehicle 18 while it remains in the station 16. Continuing the example above, the operator can determine that the desired torque value can be obtained by recalibrating the torque tool, using a supplemental torque tool, or making a variety of other adjustments. If the operator determines that the vehicle 18 is in an in-station repairable condition, then the sequence proceeds to step 130.

In step 130, the operator completes the assembly task. For instance, the operator may re-calibrate the torque tool 36 to apply the desired torque value to the fastener. Then the sequence proceeds to step 132.

In step 132, the red light turns off to indicate to the operator that nothing remains to be performed on the vehicle. Also, the operator utilizes the local I/O interface 32 to command the conveyor line 12 to resume its movement and release the vehicle 18 from the station 16. Then, the sequence proceeds to step 120.

If, however, in step 128 the operator determines that the assembly task cannot be satisfied within the station 16, then the sequence proceeds to step 134. In step 134, the operator utilizes the local I/O interface 32 to command the conveyor line 12 to resume its movement and release the vehicle 18 from the station 16. Additionally, the local I/O interface 32 sends an unsuccessful build message to a quality control server 40. As detailed in the description for FIG. 1, the quality control server 40 utilizes the unsuccessful build messages to compile a database of vehicles, which are intended to remain in the plant until the all of the incomplete or unsuccessful assembly tasks are satisfied. Also, the quality control server 40 employs a quality identifier mechanism 44 and a gate 42 to prevent non-compliant vehicles from exiting the plant. Then, the sequence proceeds to step 120.

Referring back to step 114 (as shown FIG. 2A), if the operator determines that the vehicle 18 is not the vehicle identified by the tracking controller 20, then the sequence proceeds to step 136. In step 136, the operator visually identifies the vehicle 18 and determines whether the vehicle is included in the queue. If the vehicle is included in the queue, then the sequence proceeds to step 138.

In step 138, the operator utilizes the local I/O interface 32 to access the queue and select the correct rotation number corresponding to the identified vehicle 18. Then, the sequence proceeds to step 140.

In step 140, the operator reports the tracking error to the proper attendant or maintenance person. Immediately thereafter, the sequence proceeds to step 118.

If, however, in step 136 the operator determines that the identified vehicle 18 is not included in the queue, then the sequence proceeds to step 142. In step 142, the operator determines whether a no-read condition exists. The no-read condition describes a situation when the presence of a vehicle 18 has been detected but its identity has not been determined. For example, the primary identifier mechanism 24 may not have identified the vehicle whereas the movement detector has detected the presence of the vehicle. If the no-read condition exists, then the sequence proceeds to step 144.

In step 144, the operator manually inputs the identity of the vehicle, i.e. VIN or rotation number, into the queue via the local I/O interface 32. Thereafter, the sequence proceeds to step 118.

If, however, in step 142 the no read condition does not exist, the sequence proceeds to step 140.

While particular embodiments of the invention have been shown and described, numerous variations and alternate embodiments will occur to those skilled in the art. Accordingly, it is intended that the invention be limited only in terms of the appended claims.

What is claimed is:

1. A system for manufacturing an assembly within a plant on a conveyor line comprising:

a non-segmented network including:
    a plurality of servers for storing data, said plurality of servers including a build data server for storing build data;
    at least one of a sensor and an operator for detecting an identity and a position of the assembly on the conveyor line, said conveyor line having a plurality of manufacturing zones and a plurality of stations within each of said plurality of manufacturing zones,
    a tracking controller electronically coupled to said plurality of servers for receiving data therefrom, said tracking controller for receiving said identity and said position of the assembly on the conveyor line from at least one of said sensor and said operator;
    at least one local I/O interface electronically coupled to said tracking controller and said build data server, said at least one local I/O interface receiving said data, said identity, and said position of the assembly from said controller, said at least one local I/O interface receiving said build data from said build data server for instructing said operator to perform an assembly task; and
    at least one I/O manufacturing tool electronically coupled to said at least one I/O interface, said at least one I/O manufacturing tool being utilized by said operator for performing said assembly task pursuant to said identity and said build data associated with the assembly, said at least one I/O manufacturing tool for detecting at least one of a successful build condition and an unsuccessful build condition;
    wherein said at least one local I/O interface comprises an embedded computer and a multi-colored stack light, said embedded computer having a touch screen and a plurality of non-moving parts, said multi-colored stack light electronically coupled to said embedded computer for indicating a build status to said operator.

2. The system of claim 1 wherein said non-segmented network is an Ethernet network.

3. The system of claim 1 wherein
said build data server is utilized for storing vehicle build information and transmitting vehicle build information related to said identity of the assembly to said at least one I/O interface.

4. The system of claim 1 wherein said plurality of servers comprises:

a quality control server electronically coupled to said at least one I/O manufacturing tool, said quality control server for receiving an unsuccessful build message from said at least one I/O manufacturing tool and prompting an operator to correct said unsuccessful build condition.

5. The system of claim 1 wherein said plurality of servers comprises:

a monitoring server electronically coupled to said tracking controller and said at least one I/O interface, said at least one manufacturing tool, said monitoring server for detecting at least one of an active operation condition and an equipment failure condition.

6. The system of claim 1 wherein said plurality of servers comprises:

an error proofing server electronically coupled between said at least one I/O interface and said at least one manufacturing tool, said error proofing server for generating a status report of at least one of said non-segmented network and the assembly.

7. The system of claim 1 wherein said tracking controller comprises:

a tracking I/O interface electronically coupled to said plurality of servers, said tracking I/O interface being an embedded computer with a touch screen, said embedded computer including a plurality of non-moving parts; and said sensor coupled to said tracking controller;

wherein said sensor includes a position encoder and a primary identifier mechanism, said position encoder electronically coupled to said tracking I/O interface for detecting a conveyor line position said primary identifier mechanism electronically coupled to said tracking I/O interface for identifying the assembly.

8. The system of claim 7 further comprising:

a secondary identifier mechanism for identifying the assembly when said primary identifier mechanism fails to identify the assembly.

9. The system of claim 1 wherein said at least one I/O manufacturing tool is at least one of:

a torque tool for repeatedly applying a predetermined torque value and measuring an actual torque value applied to the assembly; and a part pick light array for prompting an operator to pick a predetermined part and detecting an actual pick by said operator.

10. A method for implementing the network recited in claim 1 for manufacturing an assembly within a plant on a conveyor line, comprising:

utilizing at least one of a sensor and an operator for identifying the assembly;

receiving build data related to an identity of the assembly, said build data being stored in a build data server;

determining an assembly position of the assembly on the conveyor line, said conveyor line having a plurality of manufacturing zones and a plurality of stations within each of said plurality of zones;

utilizing a local I/O interface for prompting an operator to perform an assembly task related to the build data;

activating a multi-stack light according to a predetermined lighting pattern for notifying said operator of a build status of the assembly;

determining at least one of a successful build condition and an unsuccessful build condition;

determining at least one of an in-station repairable condition and an in-station irreparable condition when said unsuccessful build condition exists;

repairing the assembly when said in-station repairable condition exists;

retaining the assembly within the plant when said in-station irreparable condition exists; and releasing the assembly from said station.

11. The method of claim 10 further comprising:

determining at least one of a faulty tool condition and a non-faulty tool condition when said unsuccessful build condition exists.

12. The method of claim 10 wherein identifying the assembly comprises at least one of:

scanning a bar code attached to the assembly;

detecting movement of the assembly into at least one of the stations and the manufacturing zones; and prompting said operator to manually input an identification of the assembly into the network.

13. The method of claim 10 wherein determining an assembly position of the assembly comprises:

detecting a conveyor position of the assembly line; and detecting a movement of the assembly into at least one of the stations and the manufacturing zones.

14. The method of claim 10 wherein prompting an operator to perform said assembly task comprises at least one of:

displaying an assembly task message on said local I/O interface;

activating a multi-stack light according to a predetermined lighting pattern; and activating a part pick light array to indicate a predetermined part for an operator to select.

15. A method for implementing the network recited in claim 1 for manufacturing an assembly within a plant on a conveyor line, comprising:

identifying the assembly;

receiving build data related to the assembly;

determining an assembly position of the assembly on the conveyor line, said conveyor line having a plurality of manufacturing zones and a plurality of stations within each of said plurality of zones;

utilizing a local I/O interface for prompting an operator to perform an assembly task related to the build data;

determining at least one of a correct assembly condition and an incorrect assembly condition;

determining at least one of a listed assembly condition and a non-listed assembly condition when said incorrect assembly condition exists;

selecting a vehicle identity when said listed assembly condition exists;

determining a no-read condition;

inputting an identification of the assembly when said non-listed assembly condition and said no-read condition exist; and wherein prompting said operator to perform said assembly task comprises at least one of displaying an assembly task message on said local I/O interface, activating a multi-stack light according to a predetermined lighting pattern, and activating a part pick list array to indicate a predetermined part for said operator to select.

16. The method of claim 15 further comprising:

notifying said operator of a build status of the assembly, wherein notifying comprises activating a multi-stack light according to a predetermined lighting pattern.

17. The method of claim 15 wherein identifying the assembly comprises at least one of:

scanning a bar code attached to the assembly;

detecting movement of the assembly into at least one of a station and a manufacturing zone; and manually inputting an identification of the assembly into the network.

* * * * *